United States Patent [19]
Pemberton et al.

[11] Patent Number: 5,648,030
[45] Date of Patent: Jul. 15, 1997

[54] METHOD FOR OBTAINING HIGH DEFINITION GRAPHICS IN SURFACES OF MOLDED PLASTIC OBJECTS

[75] Inventors: Eric S. Pemberton, Rockwood; Brent E. Howard, Harriman, both of Tenn.

[73] Assignee: Dagger, Inc., Harriman, Tenn.

[21] Appl. No.: 382,143

[22] Filed: Feb. 1, 1995

[51] Int. Cl.$^6$ .................. B29C 39/12; B29C 41/22
[52] U.S. Cl. .................. 264/71; 264/74; 264/245; 264/310
[58] Field of Search .................. 266/245, 255, 266/310, 71, 74, 301, 302

[56] References Cited

U.S. PATENT DOCUMENTS

| | | | |
|---|---|---|---|
| 2,434,477 | 1/1948 | Winter | 264/245 |
| 2,504,063 | 3/1950 | Lemelson | 264/245 |
| 2,817,619 | 12/1957 | Bickel et al. | 264/245 |
| 3,300,557 | 1/1967 | Valentini | 264/245 |
| 4,126,727 | 11/1978 | Kaminski | 428/172 |
| 4,254,077 | 3/1981 | Fontana et al. | 264/225 |
| 4,307,058 | 12/1981 | Morell et al. | 264/510 |
| 4,405,551 | 9/1983 | Barnard et al. | 264/245 |
| 4,443,392 | 4/1984 | Becker et al. | 264/25 |
| 4,645,556 | 2/1987 | Waugh et al. | 156/242 |
| 4,882,173 | 11/1989 | La Roche et al. | 264/245 |
| 5,063,093 | 11/1991 | Mentzer | 264/245 |
| 5,073,325 | 12/1991 | Gray | 264/245 |
| 5,152,861 | 10/1992 | Hann | 156/230 |
| 5,211,593 | 5/1993 | Schneider et al. | 441/65 |
| 5,232,644 | 8/1993 | Hammond et al. | 264/73 |
| 5,262,108 | 11/1993 | Minke et al. | 264/245 |
| 5,264,172 | 11/1993 | Rosica et al. | 264/132 |
| 5,316,715 | 5/1994 | Gray | 264/245 |
| 5,324,472 | 6/1994 | Page et al. | 264/311 |
| 5,368,791 | 11/1994 | Uchida et al. | 264/245 |
| 5,370,831 | 12/1994 | Blair et al. | 264/245 |

FOREIGN PATENT DOCUMENTS

| | | | |
|---|---|---|---|
| 3055219 | 3/1991 | Japan | 264/245 |
| 3230917 | 10/1991 | Japan | 264/245 |
| 2174953 | 11/1986 | United Kingdom | 264/245 |

*Primary Examiner*—Karen Aftergut

[57] ABSTRACT

A method for achieving high definition graphics in the surface of a body molded from plastic powders. The method is specifically described for use in achieving high definition graphics in the surfaces of kayaks formed by rotational molding using plastic powders, with the kayak mold being heated to above the transition temperature of the plastic powders. The high definition graphics are achieved by preplacing a stencil containing cut-outs for the desired design against the surface of the kayak body mold. The openings of the stencil are filled with a plastic powder corresponding to the color(s) of the design. After removal of the stencil, an overlayer of plastic powder corresponding to the main kayak hull is applied. Local heating is achieved to form a skin on the combination of these pre-placed powders. Subsequent heating of the entire mold in a heated oven, with appropriate rotation of the mold, distributes the bulk powder for the hull, melts the powders, and forms the entire hull. Upon cooling, the formed kayak is removed from the mold as a kayak body that incorporates therein a durable, high-definition graphic.

11 Claims, 4 Drawing Sheets

METHOD FOR OBTAINING HIGH DEFINITION GRAPHICS IN SURFACES OF MOLDED PLASTIC OBJECTS

TECHNICAL FIELD

The present invention relates generally to molded objects and methods for obtaining graphical information upon the surface thereof, and more particularly to a method of obtaining high definition graphics in the surface of plastic objects formed by rotational molding using plastic powders.

BACKGROUND ART

Various types of printed material are applied to the surface of molded objects, particularly plastic objects. This material typically can be names of products, their manufacturer, various designs, instructions, etc. All of this material can be generally grouped under the title "graphics". One of the most common methods for adding such graphical information to objects is to apply pre-printed "label" material with glue. While this may be expedient for the mass production of some objects, the labels are easily damaged upon abrasion thereof.

For objects of lower production rates, and where the graphics are desired to be more durable, the graphical information is actually formed in the outer surface of the object. This is conventionally accomplished by applying a "transfer" of the graphics upon the surface of the mold prior to the formation of the object. The graphics transfer is usually prepared by silk screen techniques upon a release paper such that the image, with the transfer paper attached, can be placed against the mold surface followed by the removal of the transfer paper (after laboriously pressing to assure adherence of the transfer to the mold surface) prior to the molding. As a result, graphical information of a few mils (e,g, 5–10) of thickness is achieved in the surface of the molded object. This is similar to the method described in the below-cited U.S. Pat. No. 5,152,861. While graphics achieved with this method are significantly more durable, there is considerable cost in the silk screening process and each molded item requires a new transfer. Also, there is lost time in causing the transfer to adhere.

Various plastic molding techniques involving the introduction of color and/or elements such as metal flakes are described in U.S. Pat. No. : 5,232,644 issued to D. Hammond, et al, on Aug. 3, 1993; U.S. Pat. No. 5,262,108 issued to J. Minke, et al, on Nov. 16, 1993; U.S. Pat. No. 5,316,715 issued to J. Gray on May 31, 1994; and U.S. Pat. No. 5,324,472 issued to W. Page, et al, on Jun. 28, 1994.

Other U.S. Patents that may be generally related to the present invention are: U.S. Pat. No. 4,126,727 issued to S. Kaminski on Nov. 21, 1978; U.S. Pat. No. 4,307,058 issued to E. Morello, et al, on Dec. 22, 1981; U.S. Pat. No. 4,443,392 issued to J. Becker, et al, on Apr. 17, 1984; U.S. Pat. No. 4,645,556 issued to R. Waugh, et al, on Feb. 24, 1987; U.S. Pat. No. 5,152,861 issued to G. Hann on Oct. 6, 1992 U.S. Pat. No. 5,211,593 issued to S. Schneider, et al, on May 18, 1993; and U.S. Pat. No. 5,264,172 issued to G. Rosica, et al, on Nov. 23, 1993.

A rotational molding process is utilized by Dagger, Inc. in Roane County, Tennessee, to manufacture kayaks. A quantity of a selected polyethylene powder is introduced into a mold having an internal surface corresponding to a desired kayak surface shape. The mold is heated, while being rotated, such that the powder is transformed into a molten plastic state to form the kayak hull. Upon a complete transformation of the powder and distribution throughout the mold, the mold is cooled and removed from the kayak hull. Thereafter, any finishing details are performed to complete the fabrication of the kayak. Many of the kayaks have various decorative graphical material to meet customers requests and for sales appeal. They also have the company logo. The logo, as well as a number of the requested graphics, must have high definition: that is, the edges of the design must be very sharply defined.

In order to achieve high definition, both of the above-described methods of achieving graphics upon the exterior of the kayak have been employed. Obviously, a kayak is subjected to considerable abrasion so that labels applied to the surface have a very short life.

The method of applying a transfer graphic to the mold has achieved a more durable graphic presentation. However, the thickness is limited and damage does occur. The cost is very high for a one-of-the-kind graphic. Also, a new transfer is used for each kayak and, if multiple graphical designs are to be applied to each hull, there is a significant cost involved because each transfer must be prepared by silk screening (or a similar process) and then carefully transferred to the mold.

Accordingly, it is an object of the present invention to provide a method for the preparation of high definition graphics within the surface of molded objects.

It is another object of the present invention to provide a method for the preparation of high definition graphics in the surface of objects molded from plastic powders.

A further object of the present invention is to provide a method for achieving high definition graphical design in the surface of kayaks molded from plastic powder in rotational molding equipment.

Another object of the present invention is to provide a method for achieving high definition graphical design in the surface of kayaks molded from plastic powder in rotational molding equipment wherein re-usable patterns are used to significantly reduce the cost of such graphical design.

These and other objects of the present invention will become apparent upon a consideration of the drawings that follow, together with a complete description thereof.

SUMMARY OF THE INVENTION

In accordance with the present invention, a cut-out stencil is positioned against the surface of a mold for a desired product. This stencil accurately defines the desired graphical design. A first plastic powder, of the type and color for the desired graphics, is applied to the stencil to fill the open spaces thereof. After the leveling of this first powder and the removal of any surplus, the stencil is removed. The remaining first powder in the shape of the graphic is then covered with a second plastic powder of the type and color for the product. The mold is preheated in at least the area of the graphic powder to a temperature at least near the transformation temperature. Thereafter, the entire mold is heated. The preheating causes the initially placed powders to form at least a "skin" over the surface in the graphic area whereby the subsequent mold heating and powder distribution do not affect the quality of the high definition graphic design. The present invention is specifically applied to the formation of high definition graphics in the surface of kayaks fabricated from plastic powders using rotational molding.

BEST MODE FOR CARRYING OUT THE INVENTION

Figure 1:
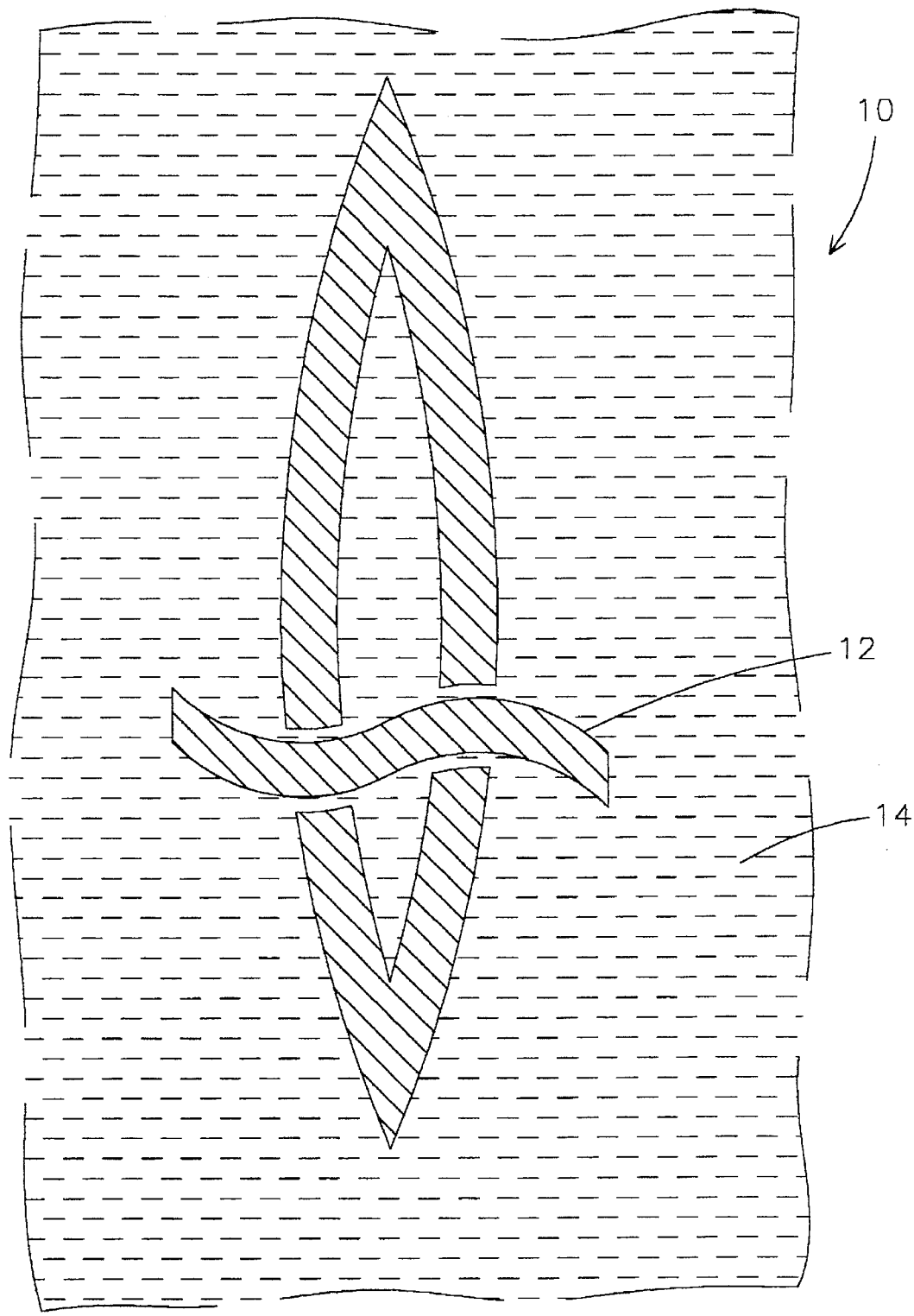
FIG. 1 illustrates a desired high definition graphical design on the surface of a molded kayak, for example, with a green logo formed in the surface of a silver kayak.

A typical kayak graphic to be produced according to the present invention is illustrated in FIG. 1. In this particular example, the graphic 10 is green logo 12 upon a silver kayak hull 14. It will be recognized that any highly defined graphic can be the product of the present invention, and that any number of combinations of colors can be utilized.

Figure 2:
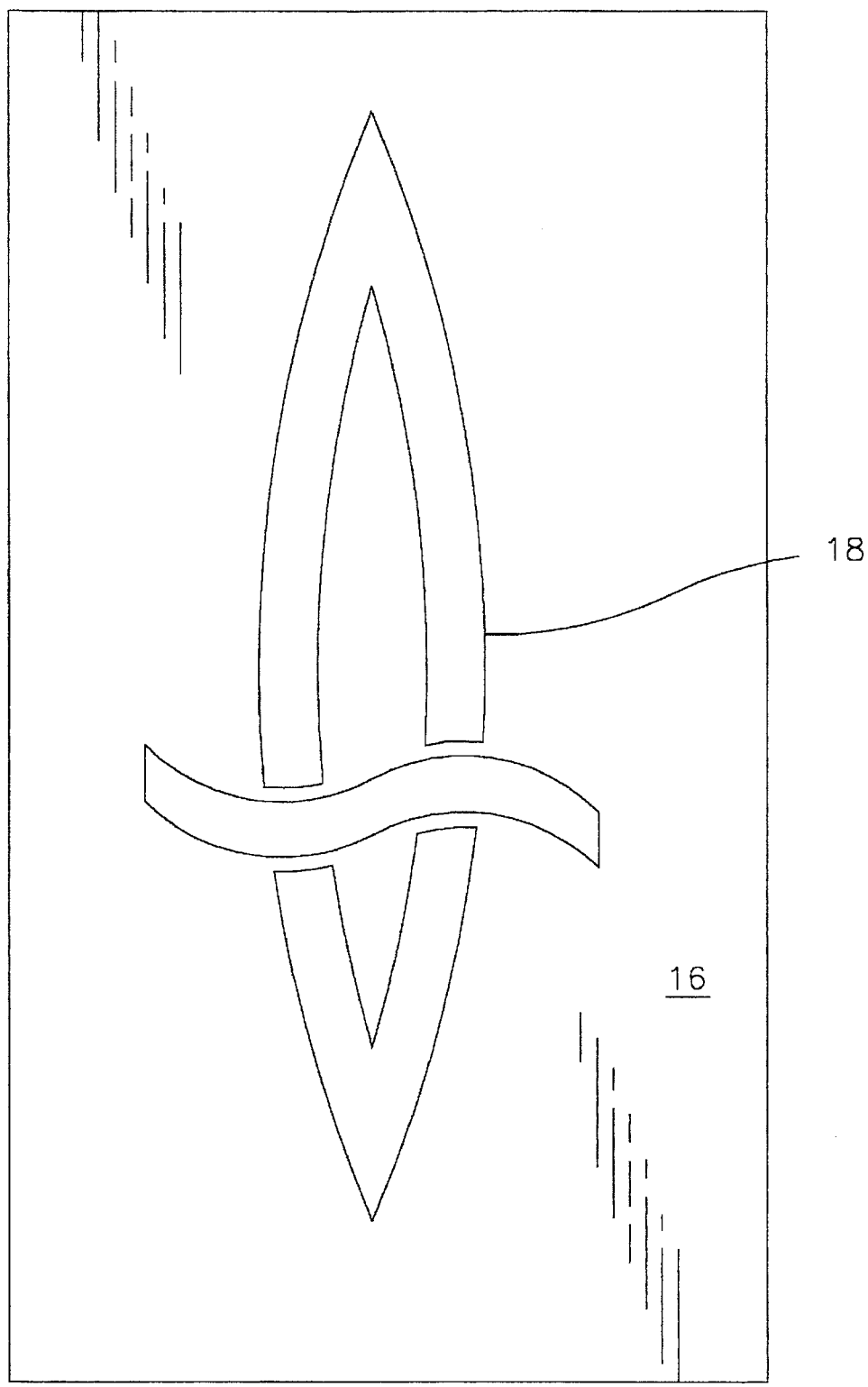
FIG. 2 is a drawing illustrating a stencil for use in the present invention to achieve the graphical design of FIG. 1.

The high definition graphic 10 of FIG. 1 is achieved through the use of a re-usable stencil such as that illustrated in FIG. 2. The stencil body 16 is typically thirty to sixty mils thick and has any design 18 cut therein. Typically this stencil body 16 is fabricated from a pliable mask material of a uniform thickness. The resulting graphic is therefore of a corresponding thickness and configuration within the surface of the molded product. As will be discussed hereinafter, this stencil is removed from the mold after placement of powder to form the selected graphic such that an initial cost of preparing one stencil is all that is invested in the formation of this particular graphic and others of like configuration in single kayaks or multiple kayaks to bear the same graphic.

Figure 3:
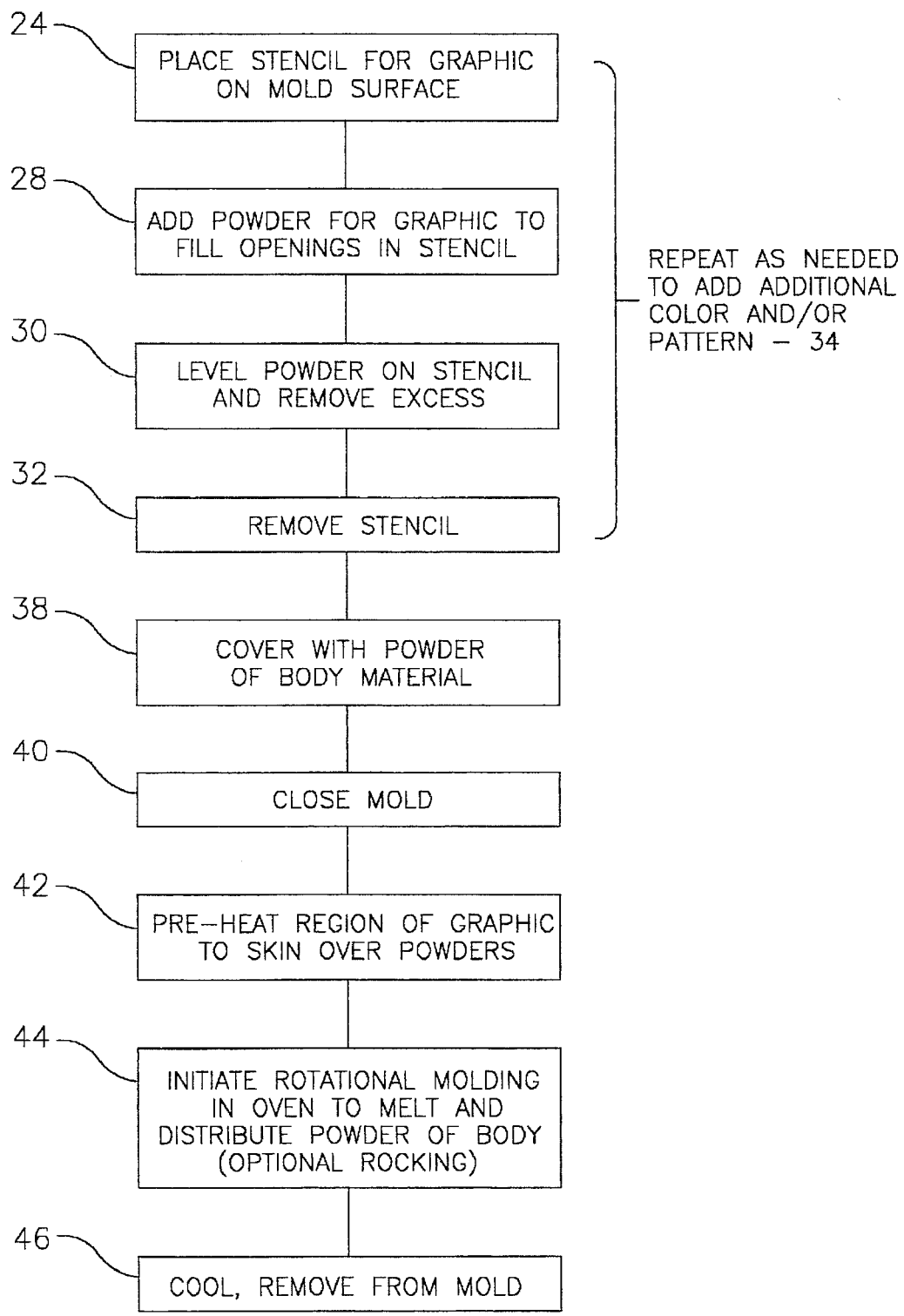
FIG. 3 is a flow chart of the steps of forming a graphical design according to the present invention.
Figure 4A:
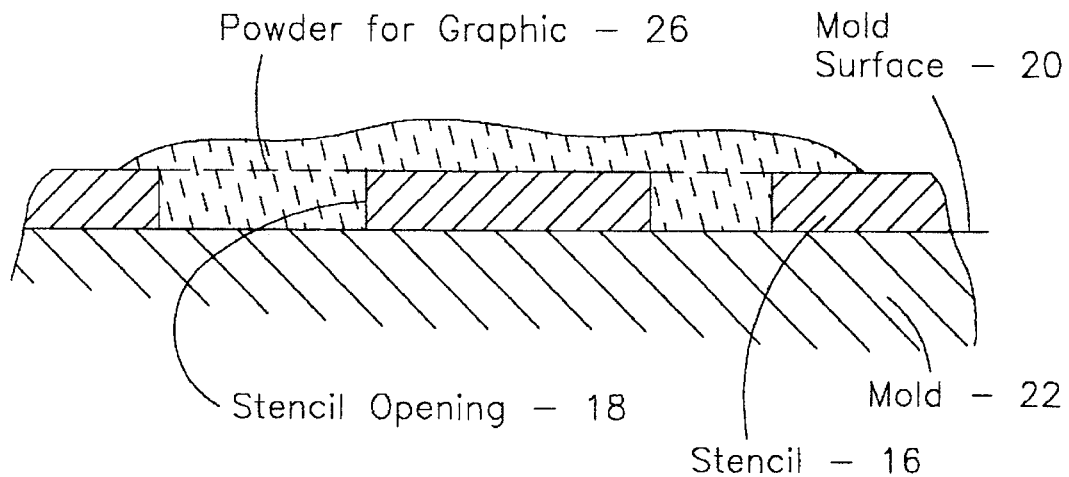
FIGS. 4A–4C are enlarged cross-sectional drawings illustrating the process steps set out in FIG. 3.
Figure 4B:
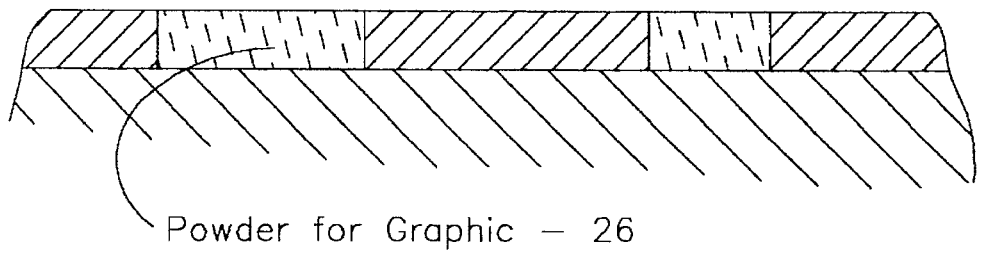
Figure 4C:
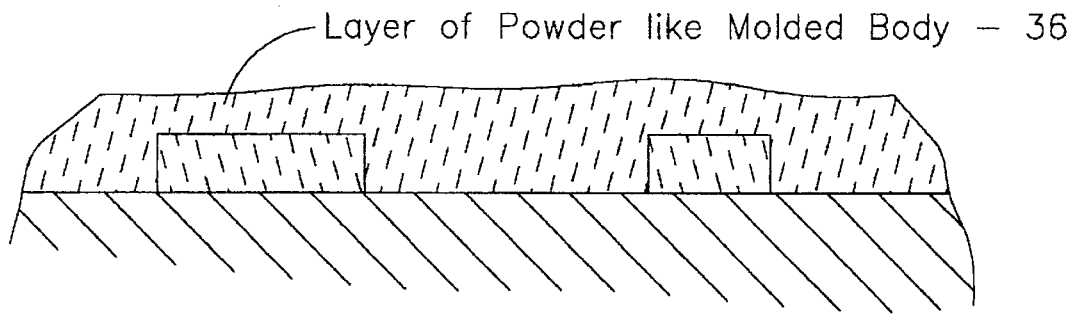

The present invention is detailed in the flow sheet of FIG. 3 and in the enlarged cross-sectional sections shown in FIGS. 4A through 4C. Initially the stencil 16 (FIG. 2) is placed against the inner surface 20 of a portion of a mold 22 (FIG. 4A), as at step 24. Typically for kayak fabrication, this is about ½ of the total mold with the dividing line between halves being at a longitudinal midpoint of the kayak. Thereafter a powder 26 corresponding to at least one color of the graphic 10 is applied to the stencil 16 to completely fill all openings 18 as in the step at 28. This results in an arrangement of FIG. 4A. The logo powder 26 is leveled, and any excess removed as at the step 30 and illustrated in FIG. 4B. Thereafter, the stencil 16 is carefully removed as indicated at 32.

If more than one color or more than one graphic is desired at the same location, steps 24–32 are repeated an appropriate number of times as indicated at 34. The same steps are carried out to form a graphic at other selected locations of the mold. Following the last removal of a stencil 16, all of the placed graphic powder(s) are carefully covered with powder 36 of the color and type as the kayak hull. This is as indicated at the step 38 in FIG. 3 and in FIG. 4C.

After of all powders for forming the graphic(s) and the charge of powder for the body have been placed in the mold, the kayak mold is closed (typically with the second ½ of the mold) as indicated at 40. Preliminary heat is applied to the local positions of the graphic(s) for a time needed to raise the temperature at the inner surface of the mold to at least near the transition temperature for conversion of the powder in this region to a plastic consistency to form a skin over at least the powder for the graphics. This is indicated at 42 of FIG. 3. Localized preheat also assists in effecting an increased thickness in portions of the kayak hull wherever this pre-heat is applied. It will be understood that, if desired this preliminary heating could be accomplished prior to the closing of the mold; however, it is preferred that heating occurs just prior to insertion of the mold into an oven (not shown). For polyethylene plastics, this preheat temperature is about 275° F. After a time sufficient to "skin over" the powders at the graphic(s) area to prevent their movement, the mold is moved into the oven where conventional heating and rotation of the mold is commenced as indicated at 44. Motion of the mold and control of the temperature distribution result in a kayak having a proper distribution of hull material within the mold. After all material is melted and distributed, the mold is then cooled, as indicated at 46 prior to removal of the kayak shell from the mold.

For rotational molding of a kayak, the mold typically has a bottom portion and a top portion, with these portions being separable at a horizontal parting line generally midway between a top surface and a bottom surface of the resultant kayak. These mold portions are typically fabricated from aluminum, and are about ¼ inch thick. During pre-heat and the molding process, the two portions are joined using clamps, bolts, etc. Clamps, however, permit the most rapid joining and separating steps. The mold is positioned within an oven having heating means to produce a desired temperature distribution to the exterior, and thus the interior, of the mold. Further, provision is made to rotate the mold at a selected speed (e.g., a few RPM) of revolution during heating. Other motions of the mold can be utilized, if desired, such as rocking the mold.

After all powder has been distributed and converted to a molten state, the mold is cooled. Usually, mold rotation is continued during this cooling step. Finally, the molded kayak hull is removed from the mold and detailing commences to produce the finished kayak.

The present invention is illustrated regarding a specific application: that of forming a kayak hull containing a selected graphical design. A mold half for that portion of the kayak to contain the graphical design is typically suspended from a crane for subsequent handling. Thereafter, a stencil for the selected design is placed against the inside surface of this mold half at the desired location. Powder of the plastic for the graphical design, usually of the same type as that for the bulk of the hull but of a desired graphics color, is distributed over the stencil to fill voids therein. The amount of plastic powder used depends upon the extent of the desired graphics. After removal of excess powder for the design, the stencil is removed. The deposited design powder is carefully covered first with a small amount (typically a few ounces) of powder of the hull type, and then with the entire charge of hull-type powder is added to the mold. After adding the remainder of the mold, localized heating of the mold (from the exterior) is performed to raise the temperature of the powders to form a skin over the combined powders. This pre-heat is also used in other portions of the mold to increase the hull thickness at selected locations. The pre-heating can be accomplished using a torch or other forms of auxiliary heaters specifically for this purpose.

As stated above, prior to the closing of the mold, the bulk of the powder for forming the body is added to the interior. This typically is 25 to 55 pounds of polyethylene powder having a particle size of about 35 Mesh. The amount depends upon the size of the desired kayak. Different types of polyethylene are typically utilized, the choice being the ultimate strength of the kayak. These types include linear low density polyethylene, medium density polyethylene, high density polyethylene, and cross-linked polyethylene. The latter forms a kayak of greatest strength—as needed for kayaks for white water use. This cross-linked material requires a longer heating time in the mold. After closure of the mold, and the "skinning" has been achieved, the overall mold is moved into an oven where it is heated to achieve an inner mold surface temperature of at least 275° F. which is the transition temperature for the polyethylenes. The oven temperature to achieve the necessary internal temperature ranges from 450°–700° F. Temperature distributions are used within the oven to achieve selected hull thickness. During the heating, which typically lasts twenty to sixty minutes, or longer depending upon the amount of the charge and the type of polyethylene, the mold is slowly rotated so that the powder charge is moved to all portions of the mold. The typical rotation is 3–7 RPM. Other mold movement, such as mold rocking, may be used with the rotation to assist in the powder and molten powder distribution.

Upon achieving the desired temperature throughout the surface of the mold such that the plastic is molten, the mold is brought to substantially room temperature while continuing the mold rotation. Typically this cooling requires about thirty minutes up to about one hour. At this point the basic kayak hull, containing the high definition surface graphical design, is firm so that it can be removed from the mold for final detailing of the kayak. The graphical design, or designs, formed in the surface of the hull are substantially the same thickness of the initial stencil, that being typically 30–60 mils. Thus, these designs are very durable during use of the kayak.

From the foregoing, it will be understood that a simplified method of achieving highly defined graphic of high durability in the surface of a molded plastic object has been achieved. By this method a one-time graphic can be economically achieved, as well as a standard graphic upon a large number of objects using an inexpensive re-usable stencil. Further, there is a labor reduction. The method is of particular value for forming plastic objects using rotational molding techniques. The type of graphical designs achieved by the present invention are of particular value in kayak manufacturing where the ultimate graphical design must withstand excessive abrasion.

Although certain method conditions are contained herein, they are only for a full explanation of a typical utilization of the present invention and not for limiting the invention. Rather, the invention is to be limited only by the appended claims and their equivalents.

We claim:

1. A method of forming a high definition graphical design in a surface of a body using plastic powders and a mold having an internal cavity, which comprises the steps:

placing a reusable stencil having openings corresponding to the graphical design against a selected location on an inner surface of the cavity of the mold;

filling the openings in the stencil with a loose first plastic powder of a color for the graphical design;

removing the stencil from the surface of the mold;

covering the loose first plastic powder for the graphical design with a limited amount of a loose second plastic powder of a color for the body, the second plastic powder being of a same plastic composition as the first plastic powder;

adding over the limited amount of the second plastic powder a quantity of the loose second plastic powder to the mold in a amount sufficient to form the body;

locally heating an exterior of the mold at a position of the first plastic powder and at a position of the limited amount of the second plastic powder to a temperature proximate a transition temperature of the first and second plastic powders to form a skin on at least the first plastic powder to retain the first plastic powder in a position as established by the openings in the stencil;

continuing heating of the mold in its entirety to at least the transition temperature of the first and second plastic powders for a time sufficient to convert the first and second plastic powders to a molten state;

rotating the mold during the continuing heating step to distribute molten second plastic powder over the inner surface of the cavity of the mold to form the body;

cooling the heated mold containing the molded body during continued rotating wherein a high definition graphical design is formed in a surface of the molded body; and removing the body from the mold.

2. The method of claim 1 wherein the first and second plastic powders are selected from the group consisting of linear low density polyethylene, medium density polyethylene, high density polyethylene and cross-linked polyethylene.

3. The method of claim 1 wherein the step of placing the stencil and the step of filling the openings of the stencil are repeated to achieve multiple configurations and multiple color graphic designs with multiple stencils.

4. The method of claim 1 further comprising the step of rocking the mold during the step of continuing heating of the mold in its entirety.

5. The method of claim 1 wherein the step of continuing heating the mold it its entirety is accomplished in an oven heated to above the transition temperature of the first and second plastic powders.

6. A method of forming a high definition graphical design in a surface of a kayak body using plastic powders and a mold having an internal cavity, which comprises the steps:

placing a reusable stencil having openings corresponding to the graphical design against a selected location on an inner surface of the cavity of a first portion of the mold;

filling the openings in the stencil with a loose first cross-linked polyethylene plastic powder of a color for the graphical design;

removing the stencil from the surface of the mold;

covering the first plastic powder for the graphical design with a limited amount of a loose second cross-linked polyethylene plastic powder of a color for the kayak body and having a same plastic composition as the first cross-linked polyethylene plastic powder;

adding to the first portion of the mold, over the limited amount of the second plastic powder, a quantity of the loose second plastic powder in an amount sufficient to form the kayak body;

closing the mold by fastening a second mold portion to the first mold portion;

placing the closed mold into an oven for heating of the mold;

locally heating an exterior of the mold within the oven at a position of the first plastic powder and at a position of the limited amount of the second plastic powder to a temperature proximate a transition temperature of the first and second plastic powders to form a skin on at least the first plastic powder to retain the first plastic powder in a position as established by the openings in the stencil;

continuing heating the mold in its entirety to at least the transition temperature of the first and second plastic powders for a time sufficient to convert the first and second plastic powders to a molten state;

rotating the mold around a longitudinal axis of the mold during the continuing heating step in the oven until the first and second plastic powders have melted and molten plastic of the second plastic powder is distributed over the inner surface of the cavity of the mold to form the kayak body;

cooling and rotating the heated mold to solidify the molten plastics; and removing the molded kayak body from the mold wherein the high definition graphical design is formed in the surface of the molded kayak body.

7. The method of claim 6 wherein the step of placing the stencil and the step of filling the openings of the stencil are repeated to achieve multiple configurations and multiple color graphic designs using multiple stencils.

8. The method of claim 6 further comprising the step of rocking the mold during the step of rotation and heating of the mold.

9. The method of claim 6 wherein the stencil has a thickness of about thirty to about sixty microns.

10. The method of claim 3 wherein the stencils have openings of variant graphical designs and wherein the first plastic powder is of variant colors.

11. The method of claim 7 wherein the stencils have openings of variant graphical designs and wherein the first plastic powder is of variant colors.

* * * * *